(12) United States Patent
Adachi

(10) Patent No.: US 11,669,233 B2
(45) Date of Patent: *Jun. 6, 2023

(54) DISPLAY CONTROL DEVICE, METHOD AND NON-TRANSITORY COMPUTER READABLE MEDIUM

(71) Applicant: FUJIFILM Business Innovation Corp., Tokyo (JP)

(72) Inventor: Naoki Adachi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,184

(22) Filed: Dec. 15, 2021

(65) Prior Publication Data

US 2022/0107723 A1    Apr. 7, 2022

Related U.S. Application Data

(63) Continuation of application No. 16/846,387, filed on Apr. 12, 2020, now Pat. No. 11,226,728.

(30) Foreign Application Priority Data

Oct. 4, 2019   (JP) .............................. JP2019-184074

(51) Int. Cl.
*G06F 3/048* (2013.01)
*G06F 3/04842* (2022.01)
*G06F 3/04845* (2022.01)
*G06F 40/106* (2020.01)

(52) U.S. Cl.
CPC .......... *G06F 3/04842* (2013.01); *G06F 3/048* (2013.01); *G06F 3/04845* (2013.01); *G06F 40/106* (2020.01); *G06F 2203/04803* (2013.01)

(58) Field of Classification Search
CPC ............. G06F 3/04842; G06F 3/04845; G06F 2203/04803; G06F 3/048
See application file for complete search history.

(56) References Cited

U.S. PATENT DOCUMENTS 11,226,728 B2 *   1/2022   Adachi ................. G06F 3/0481
2011/0191337 A1 *  8/2011   Cort ................... G06F 16/24578
                                              707/E17.084

* cited by examiner

*Primary Examiner* — Roy P Rabindranath
(74) *Attorney, Agent, or Firm* — JCIPRNET

(57) ABSTRACT

A display control device includes a processor. The processor displays plural areas. The plural areas include a first area, a second area, a third area and a fourth area. The first area is related to a search for content data by a user. The second area is related to a selection of content data by the user. The third area is related to a display of content of the content data selected in the second area. The fourth area is related to a user's edit of information associated with the content data displayed in the third area. The processor hides the first area and the second area and does not hide the third area and the fourth area when the content data is selected by the user in the second area.

13 Claims, 13 Drawing Sheets

FIG.4

| DOCUMENT ID | CONTENT DATA | IMAGE DATA FOR PREVIEW | ITEM INFORMATION | ACCESS RIGHT INFORMATION |
|---|---|---|---|---|
| doc001 | [BINARY DATA] | [BINARY DATA] | [LIST OF ITEMS AND ITEM VALUES] | [LIST OF USERS AND RIGHTS] |
| doc002 | [BINARY DATA] | [BINARY DATA] | [LIST OF ITEMS AND ITEM VALUES] | [LIST OF USERS AND RIGHTS] |
| doc003 | [BINARY DATA] | [BINARY DATA] | [LIST OF ITEMS AND ITEM VALUES] | [LIST OF USERS AND RIGHTS] |

| LAYOUT SETTING ID | LAYOUT SETTING NAME | LAYOUT PATTERN | INITIAL VALUES OF HEIGHT/WIDTH OF EACH PANE | INITIAL VALUES OF OPEN/CLOSE STATES OF EACH PANE | DISPLAY ITEMS OF NAVIGATION | DISPLAY ITEMS OF PROPERTY |
|---|---|---|---|---|---|---|
| layout001 | LAYOUT FOR CONTINUOUS BROWSING AND EDITING | PATTERN 6 | [LIST OF HEIGHTS AND WIDTHS] | [LIST OF OPEN/ CLOSE STATES] | [LIST OF DISPLAY ITEMS] | [LIST OF DISPLAY ITEMS] |
| layout002 | LAYOUT FOR GENERAL OPERATION | PATTERN 1 | [LIST OF HEIGHTS AND WIDTHS] | [LIST OF OPEN/ CLOSE STATES] | [LIST OF DISPLAY ITEMS] | [LIST OF DISPLAY ITEMS] |

| INITIAL VALUES OF HEIGHT/WIDTH | VALUES (%) |
|---|---|
| HEIGHT OF NAVIGATION | 50 |
| WIDTH OF NAVIGATION | 30 |
| HEIGHT OF DOCUMENT LIST | 50 |
| WIDTH OF DOCUMENT LIST | 30 |
| HEIGHT OF PROPERTY1 | 100 |
| WIDTH OF PROPERTY1 | 35 |
| HEIGHT OF PROPERTY2 | 100 |
| WIDTH OF PROPERTY2 | 35 |

| OPEN/CLOSE STATES | FOLDED |
|---|---|
| NAVIGATION | False |
| DOCUMENT LIST | False |
| PROPERTY 1 | False |
| PROPERTY 2 | True |

| DISPLAY ITEMS OF NAVIGATION | DISPLAY | INITIAL DISPLAY |
|---|---|---|
| TREE | True | False |
| SEARCH | True | True |
| SEARCH SETTING LIST | True | False |
| FAVORITE LIST | True | False |

| DISPLAY ITEMS OF PROPERTY | DISPLAY OF PROPERTY 1 | INITIAL DISPLAY OF PROPERTY 1 | DISPLAY OF PROPERTY 2 | INITIAL DISPLAY OF PROPERTY 2 |
|---|---|---|---|---|
| PREVIEW | True | True | False | False |
| ITEM VALUE EDITING | False | False | True | True |
| ACCESS RIGHT EDITING | True | False | False | False |
| STATE EDITING | False | False | True | False |

DISPLAY CONTROL DEVICE, METHOD AND NON-TRANSITORY COMPUTER READABLE MEDIUM

CROSS-REFERENCE TO RELATED APPLICATIONS

This application is a continuation application of and claims the priority benefit of a prior application Ser. No. 16/846,387, filed on Apr. 12, 2020, now allowed, which is based on and claims priority under 35 USC 119 from Japanese Patent Application No. 2019-184074 filed Oct. 4, 2019.

BACKGROUND

1. Technical Field

The present disclosure relates to a display control device and a non-transitory computer readable medium.

2. Related Art

There is a technology that allows a user to browse document data, image data, or other content data managed by a server, and edit information associated with the displayed content data (see, for example, JP-A-2005-322083).

JP-A-2005-322083 discloses a document attribute input device including: an impartment attribute storage unit that stores an attribute value imparted to a document for each attribute impartment process; a document designation unit that designates a document to be verified; a verification time attribute input form display unit that displays, in an attribute input form display area, an attribute value imparted by the attribute impartment process for the document designated by the document designation unit and an attribute value input field into which a verifier inputs the attribute value; a document display unit that displays the document designated by the document designation unit in a document display area; and an attribute value input unit that inputs an attribute value based on a user's operation in the attribute value input field displayed in the attribute input form display area.

SUMMARY

When an area for browsing content data or editing information and an area for searching for content data or specifying content data are arranged vertically, the vertical length of the area for browsing content data or editing information is reduced, and user's convenience is reduced.

Aspects of non-limiting embodiments of the present disclosure relate to providing a display control device, a method and a non-transitory computer readable medium capable of improving user's convenience as compared with a case where an area for browsing content data or editing information and an area for other uses for content data are arranged vertically.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display control device including a processor. The processor displays plural areas. The plural areas include a first area, a second area, a third area and a fourth area. The first area is related to a search for content data by a user. The second area is related to a selection of content data by the user. The third area is related to a display of content of the content data selected in the second area. The fourth area is related to a user's edit of information associated with the content data displayed in the third area. The processor hides the first area and the second area and does not hide the third area and the fourth area when the content data is selected by the user in the second area

BRIEF DESCRIPTION OF THE DRAWINGS

Exemplary embodiment(s) of the present disclosure will be described in detail based on the following figures, wherein:

FIG. 4 is a diagram illustrating an example of information registered in a document DB;

FIG. 7 is a diagram illustrating an example of information registered in a layout setting DB;

FIG. 9 is a diagram illustrating an example of a list of initial values of the height and width of each pane constituting a layout;

FIG. 10 is a diagram illustrating an example of a list of initial values of open/close states of each pane constituting a layout;

FIG. 11 is a diagram illustrating an example of a list of display items of a navigation pane included in a layout;

FIG. 12 is a diagram illustrating an example of a list of display items of a property pane included in a layout;

FIG. 16 is a diagram illustrating an example of a user interface;

DETAILED DESCRIPTION

Figure 1:
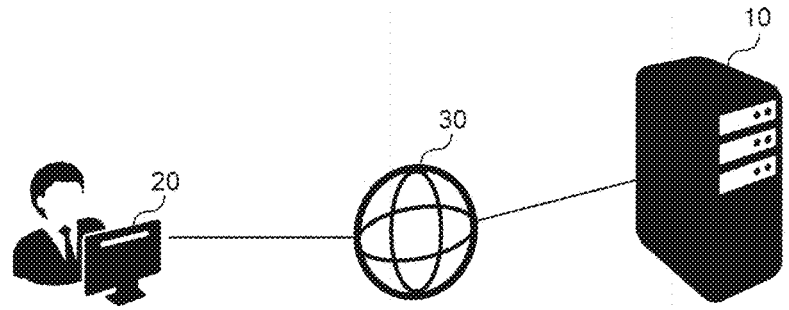
FIG. 1 is a diagram illustrating a schematic configuration of a document management system according to the present exemplary embodiment.

Hereinafter, an example of an exemplary embodiment of the present disclosure will be described with reference to the drawings. In the drawings, the same or equivalent elements and portions are denoted by the same reference numerals.

The dimensional ratios in the drawings are exaggerated for convenience of description and may be different from the actual ratios.

FIG. 1 is a diagram illustrating a schematic configuration of a document management system according to the present exemplary embodiment. The document management system illustrated in FIG. 1 includes a document management server 10 as a display control device and a user terminal 20. The document management server 10 and the user terminal 20 are mutually connected by a communication line 30 such as the Internet or an Intranet. The communication line 30 may be a wired line or a wireless line, and may be a dedicated line used only by a specific user or a public line in which an unspecified number of users share the same line.

The document management server 10 stores document data, which is an example of content data. The document management server 10 provides document data in response to a request from a user. Document data refers to digital data that is a document. The document management server 10 not only provides the document data to the user terminal 20 but also generates a preview image from the document data and displays the generated preview image on a screen of the user terminal 20. In the present exemplary embodiment, the preview image is an image used for preview display of document data stored in the document management server 10.

The user terminal 20 is a terminal used by a user of the document management system and may be any terminal such as a desktop computer, a laptop computer, a tablet, or a smartphone.

When an operation related to registration of document data is performed at the user terminal 20 and a registration request for document data is transmitted from the user terminal 20 to the document management server 10, the document management server 10 registers the document data for which registration has been requested.

When an operation related to creation of a preview image of document data is performed in the user terminal 20 and a request for creating the preview image is transmitted from the user terminal 20 to the document management server 10, the document management server 10 generates a preview image requested to be created.

When an operation related to document data browsing is performed from the user terminal 20 to the document management server 10 and a browsing request is transmitted from the user terminal 20, the document management server 10 transmits a preview image of the requested document data to the user terminal 20 that has requested the document data.

In the present exemplary embodiment, the preview image is an image displayed on a Web browser or other software for displaying document data stored in the document management server 10 or editing information added to the document data. The preview image according to the present exemplary embodiment is an image that is restricted so that the user may not perform an operation such as downloading, editing, or uploading by the user.

Although the document management system illustrated in FIG. 1 includes a single user terminal 20, but may include plural user terminals 20. The document management system may include plural document management servers 10.

Figure 2:
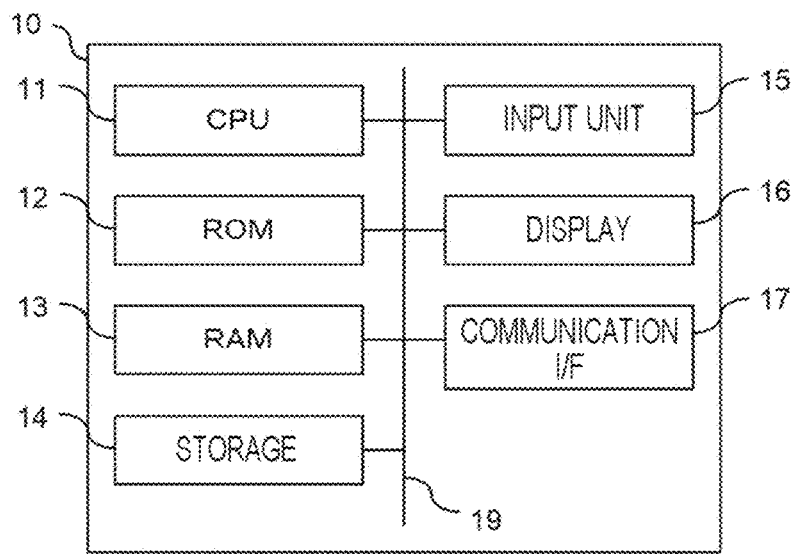
FIG. 2 is a block diagram illustrating a hardware configuration of a document management server.

FIG. 2 is a block diagram illustrating a hardware configuration of the document management server 10.

As illustrated in FIG. 2, the document management server 10 includes a central processing unit (CPU) 11, a read only memory (ROM) 12, a random access memory (RAM) 13, a storage 14, an input unit 15, a display 16, and a communication interface (I/F) 17. The respective elements are connected to each other via a bus 19 to be able to communicate with each other.

The CPU 11 is a central processing unit that executes various programs and controls each unit. That is, the CPU 11 reads the program from the ROM 12 or the storage 14 and executes the program using the RAM 13 as a work area. The CPU 11 controls the above components and performs various arithmetic processes according to a program recorded in the ROM 12 or the storage 14. In the present exemplary embodiment, a user interface providing program is stored in the ROM 12 or the storage 14 that executes image processing on image data.

The ROM 12 stores various programs and various data. The RAM 13 temporarily stores a program or data as a work area. The storage 14 is implemented by a storage device such as a hard disk drive (HDD), a solid state drive (SSD), or a flash memory, and stores various programs including an operating system and various data.

The input unit 15 includes a pointing device, such as a mouse and a keyboard, and is used to perform various inputs.

The display 16 is, for example, a liquid crystal display, and displays various information. The display 16 may adopt a touch panel method to function as the input unit 15.

The communication interface 17 is an interface for communicating with other devices, such as the user terminal 20, and uses standards such as Ethernet (registered trademark), FDDI, and Wi-Fi (registered trademark).

Next, a functional configuration of the document management server 10 will be described.

Figure 3:
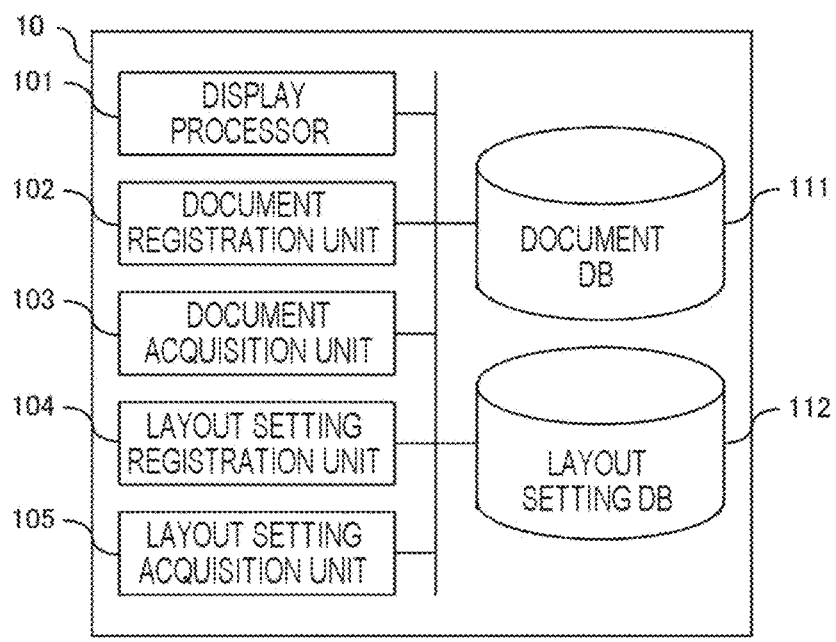
FIG. 3 is a block diagram illustrating an example of a functional configuration of the document management server.

FIG. 3 is a block diagram illustrating an example of a functional configuration of the document management server 10.

As illustrated in FIG. 3, the document management server 10 includes a display processor 101, a document registration unit 102, a document acquisition unit 103, a layout setting registration unit 104, and a layout setting acquisition unit 105 as functional components. Each of the functional components is implemented by the CPU 11 reading and executing a display control program stored in the ROM 12 or the storage 14. The document management server 10 has a document DB 111 and a layout setting DB 112. The document DB 111 and the layout setting DB 112 may be generated in, for example, the storage 14.

In the present exemplary embodiment, the term "DB" indicates a storage area for storing data. It is needless to say that a database application may be used to manage a storage area for storing data.

The display processor 101 causes the user terminal 20 that has accessed the document management server 10 to display a predetermined user interface. When displaying the user interface on the user terminal 20, the display processor 101 acquires information from the document DB 111 and the layout setting DB 112, and displays the user interface based on the acquired information. The display processor 101 may be, for example, an application that displays the user interface on a Web browser installed on the user terminal 20. The layout of the user interface displayed on the user terminal 20 by the display processor 101 will be described later in detail.

The document registration unit 102 registers document data in the document DB 111 or updates document data in the document DB 111 based on a request for registration of document data from a user.

The document acquisition unit 103 acquires document data from the document DB 111 based on an acquisition request for document data from the user. The acquisition request for document data from the user includes, for example, a request for displaying a preview image, a request for displaying information extracted from the document data, and the like. In the following description, the attribute of information extracted from the document data is also referred to as an "item", and the value of each item is also referred to as an "item value".

Here, an example of information registered in the document DB 111 will be described. FIG. 4 is a diagram illustrating an example of information registered in the document DB 111. The document DB 111 stores a document ID for uniquely identifying document data, content data (binary data) which is the document data, content data (binary data) of a preview image of the document data, item information including a list of items and item values of document data, and access right information including a list of users and rights. FIG. 4 illustrates an example in which information on document data having document IDs "doc001", "doc002", and "doc003" is registered.

Figure 5:
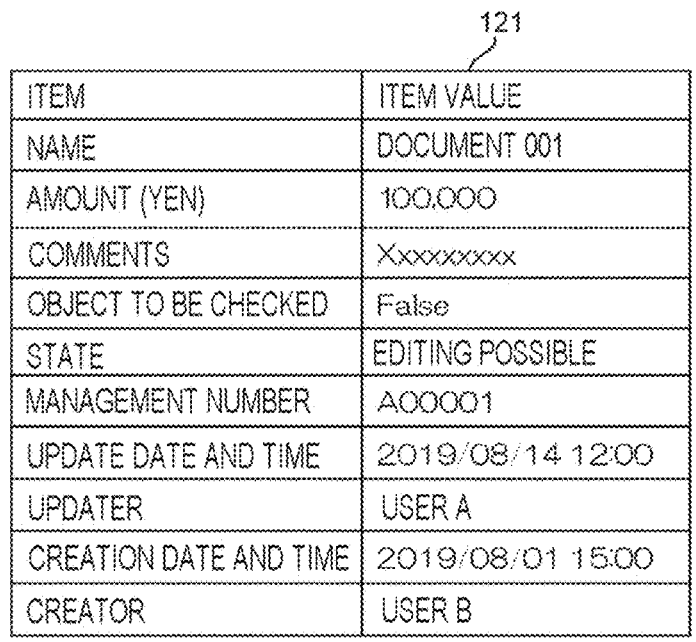
FIG. 5 is a diagram illustrating an example of item information including a list of items and item values of document data.

FIG. 5 is a diagram illustrating an example of item information 121 including a list of items and item values of document data. The example illustrated in FIG. 5 refers to the item information of document data having the document ID "doc001" among the document data registered in the document DB 111. The contents of the item information 121 may be displayed on a user interface displayed on the user terminal 20. The contents of the item information 121 change according to the contents of the document data. Therefore, the information registered in the document DB 111 as the item information 121 is not limited to the contents illustrated in FIG. 5. Another list of items and item values may be registered as item information 121 in other document data.

Figure 6:
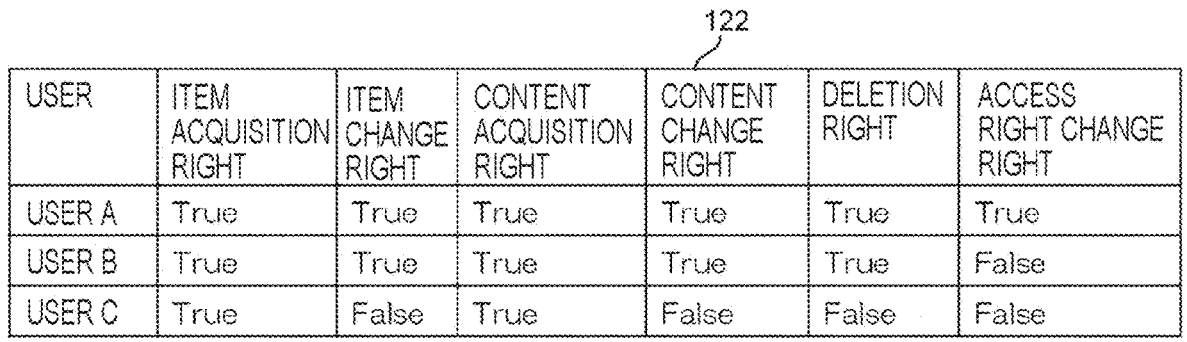
FIG. 6 is a diagram illustrating an example of access right information including a list of users and rights.

FIG. 6 is a diagram illustrating an example of access right information 122 including a list of users and rights. The access right information is information that may be set for each document data. The example illustrated in FIG. 6 refers to the access right information in document data having the document ID "doc001". For the document data having the document ID "doc001", various rights are set for each of three users (user A, user B, and user C).

The example in FIG. 6 represents that all three users have an item acquisition right which is a right to acquire the item of the document data, but only the user C does not have an item change right which is a right to change the item. The example in FIG. 6 represents that all three users have a content acquisition right which is a right to acquire the content that is the document data, but only the user C does not have a content change right which is a right to change the content of the document data. The example in FIG. 6 represents that only the user C does not have a deletion right which is a right to delete the document data, and only the user A has an access right change right which is a right to change the access right to the document data. The access right to document data refers to the right to browse document data and edit item values.

The layout setting registration unit 104 registers a layout setting, which is information relating to a layout of a user interface to be displayed on the user terminal 20, in the layout setting DB 112.

The layout setting acquisition unit 105 acquires a layout setting from the layout setting DB 112 and sends the layout setting to the display processor 101. The display processor 101 causes the user terminal 20 to display a user interface with a layout based on the layout setting transmitted from the layout setting acquisition unit 105.

Here, an example of information registered in the layout setting DB 112 will be described. FIG. 7 is a diagram illustrating an example of information registered in the layout setting DB 112. The layout setting DB 112 stores a layout setting ID for uniquely identifying a layout setting, a layout setting name which is a name of each layout setting, a layout pattern of each layout setting, initial values of the height and width of the pane, which is an example of the area constituting each layout, initial values of the open/close states of each pane, display items of a navigation pane included in each layout, and display items of a property pane included in each layout. FIG. 7 represents an example in which layout setting information having layout setting IDs "layout001" and "layout002" is stored. The "pane" indicates each of the areas when a window is divided into plural areas.

Figure 8:
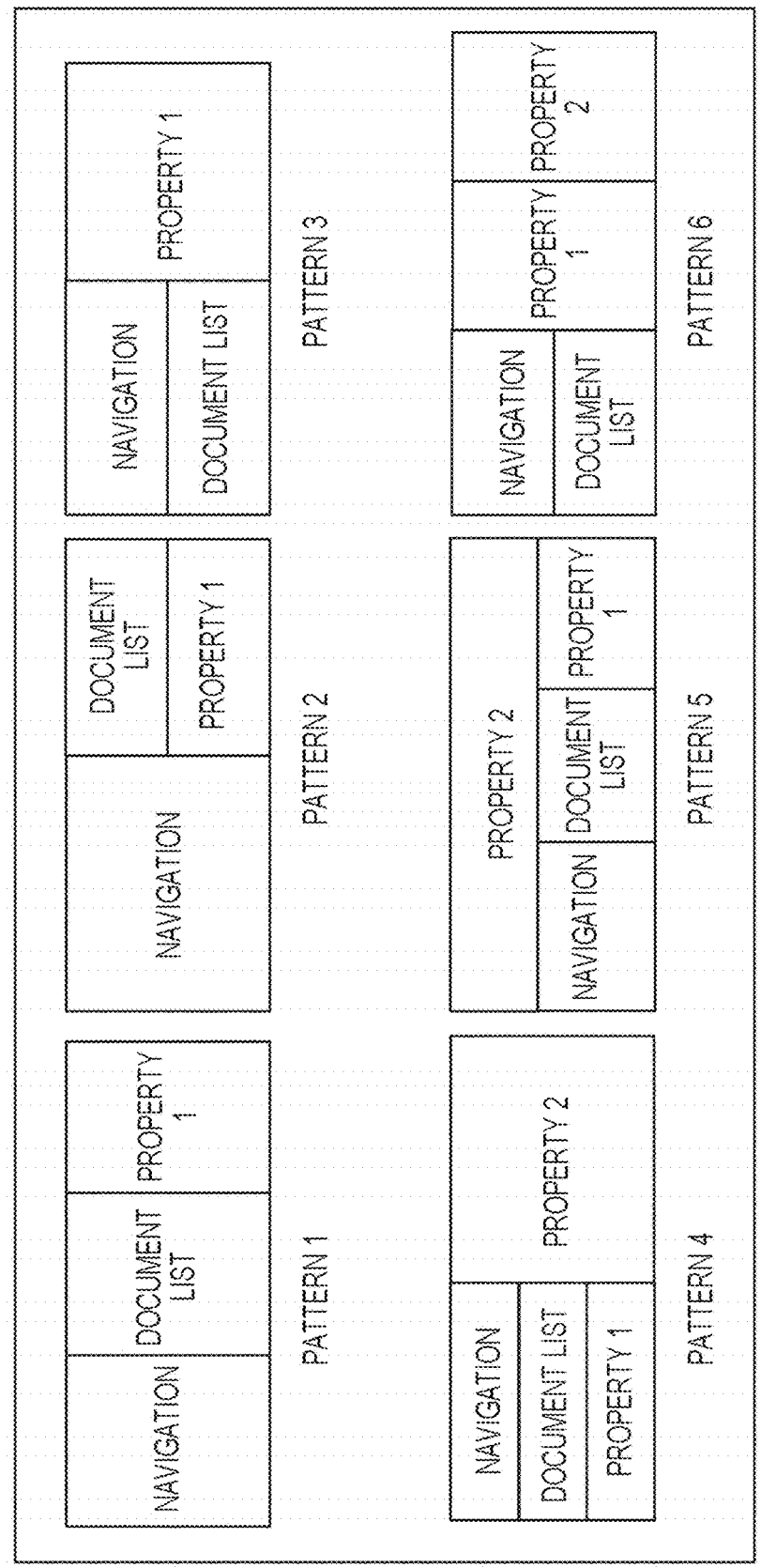
FIG. 8 is a diagram illustrating an example of a layout pattern prepared in advance by the document management server.

The document management server 10 of the present exemplary embodiment prepares plural layout patterns in advance. FIG. 8 is a diagram illustrating an example of a layout pattern prepared in advance by the document management server 10. FIG. 8 illustrates six layout patterns. The user selects any layout pattern from layout patterns prepared in advance by the document management server 10. The document management server 10 provides a user interface based on the layout pattern selected by the user. The contents of the pane included in each layout pattern will be described.

The navigation pane is a pane that provides a user interface for searching for document data. As a user interface for searching for document data, for example, a screen for displaying the storage location of document data in a tree structure, a screen for searching for document data by specifying search conditions, a screen for displaying document data search settings, and a screen for directly accessing a user's favorite document data may be used. By displaying the storage location of the document data in a tree structure, the user may search for the location where the desired document data is stored. Therefore, the screen for displaying the storage location of the document data in a tree structure is a user interface for searching the document data.

A document list pane is a pane that provides a user interface for displaying a list of document data or folders in which the document data is stored. Specifically, the document list pane is a pane that provides a user interface for allowing the user to select any of the document data obtained through the user's search in the navigation pane. The document list pane provides, for example, a user interface for displaying a list of document data matching the search condition input in the navigation pane or a folder in which document data matching the search condition input in the navigation pane is stored. The document list pane also provides, for example, a user interface for displaying a list of document data stored in the folder specified by the user in the navigation pane.

A property pane is a pane that provides a user interface for displaying information on the document data specified in the document list pane and for allowing a user to edit item values associated with the document data. The information on the document data is, for example, a preview image created by the document management server 10. Each layout pattern prepared in advance by the document management server 10 has one or two property panes.

It is convenient for the user if the area for browsing the preview image of the document data and editing the item values is vertically long. This is because the document data is often vertically oriented, and the number of items of the document data may be large depending on the document data. A user interface having a layout that allows the user to edit the item values of the document data while browsing the preview image of the document data is convenient for the user. Therefore, a user interface having a layout in which two vertically long property panes are prepared is convenient for the user.

Among patterns 1 to 5 of the layout illustrated in FIG. 8, the layouts provided with two property panes are pattern 4 and pattern 5. However, in all these layouts, an area for browsing a preview image of document data or editing item values, and an area for searching for or selecting document data are arranged vertically. In these layouts, the vertical length of the pane for browsing the preview image of the document data or editing item values is reduced, and the convenience for the user is reduced.

Thus, the document management server 10 of the present exemplary embodiment provides pattern 6 illustrated in FIG. 8 as a layout pattern. In pattern 6, a navigation pane and a document list pane are arranged vertically. In pattern 6, two property panes are arranged next to the navigation pane and the document list pane. The navigation pane is an example of a first area of the present disclosure, and the document list pane is an example of a second area of the present disclosure. The two property panes are examples of a third area and a fourth area of the present disclosure. When the property panes are described separately, the two property panes are referred to as property 1 pane and property 2 pane, respectively.

By arranging each pane as in pattern 6 illustrated in FIG. 8, the document management server 10 may cause the user to perform an operation such that the user's gaze moves from upper left to lower right when searching for, selecting, browsing, and editing document data.

The vertical length of the property pane may be longer than the vertical length of the navigation pane and the document list pane. The vertical length of the property pane may be equal to or greater than a sum of the vertical lengths of the navigation pane and the document list pane. The vertical length of the property pane may extend over the vertical length of the navigation pane and the document list pane.

In the present exemplary embodiment, each pane corresponds to a work area, and an area for operating an application that displays a user interface is not included in the pane. For example, an area for operating an application that displays a user interface, such as a menu bar, a status bar, a link bar, or a shortcut bar, and an area that is arranged across plural panes in the horizontal direction are not included in each pane. Therefore, it is assumed that the vertical length of each pane is equivalent to the vertical length of the work area, and the vertical length of the area for operating the entire user interface is not included in the vertical length of each pane. However, each of the panes may be provided with an area that provides a function of operating each pane. In such a case, an area that provides a function of operating the pane may be included in the pane.

The document management server 10 according to the present exemplary embodiment provides the layout pattern illustrated in pattern 6 in FIG. 8, thereby improving the convenience of the user as compared with a case where another layout pattern is provided.

FIG. 9 is a diagram illustrating an example of a list of initial values 131 of the height and width of each pane constituting a layout. The initial values of the height and width of the pane are information that may change for each layout. The example illustrated in FIG. 9 indicates the initial values of the height and width in the layout setting with the layout setting ID "layout001". In FIG. 9, the values of the width and height of the navigation pane, the width and height of the document list pane, and the width and height of the two property panes are set as percentages. The height and width of the pane may be set as a percentage or may be specified as an absolute value of the number of pixels. When set as a percentage, a ratio to the height of the entire user interface may be set. The height of the entire user interface herein does not include an area for operating the entire user interface.

FIG. 10 is a diagram illustrating an example of a list of initial values 132 of open/close states of each pane constituting a layout. The initial values of the open/close states of each pane are information that may change for each layout. The example illustrated in FIG. 10 indicates an initial value of the open/close state in the layout setting with the layout setting ID "layout001". FIG. 10 represents, as initial values, an example in which the navigation pane, the document list pane, and the property 1 pane are open, but the property 2 pane is closed.

FIG. 11 is a diagram illustrating an example of a list of display items 133 of the navigation pane included in the layout. The display items of the navigation pane are information that may change for each layout. The example illustrated in FIG. 11 indicates an initial value of a display item of the navigation pane in a layout setting whose layout setting ID is "layout001". FIG. 11 represents an example in which a tree display screen, a search screen, a search setting list screen, and a favorite list screen are displayed as initial values, and the search screen is initially displayed among the four screens.

FIG. 12 is a diagram illustrating an example of a list of display items 134 of the property pane included in the layout. The display items of the property pane are information that may change for each layout. The example illustrated in FIG. 12 indicates the initial values of display items of the property 1 pane and the property 2 pane in the layout setting whose layout setting ID is "layout001". FIG. 12 represents an example in which a display screen of a preview image and an access right edit screen are displayed in the property 1 pane, and an item value edit screen and a state edit screen are displayed in the property 2 pane. FIG. 12 represents an example in which the property 1 pane initially displays the display screen of the preview image, and the property 2 pane initially displays the item value edit screen.

The same information may be stored in the layout setting DB 112 for all users. However, the layout which is most convenient to use may vary according to users. Therefore, the layout setting DB 112 may store different information for each user who uses the document management system.

In the example illustrated in FIG. 3, the display processor 101 is included in the document management server 10, but the present disclosure is not limited to this example. The display controller 101 may be included in a device different from the document management server 10. When the display controller 101 is included in a device different from the document management server 10, the display controller 101 accesses the document management server 10 and acquires information from the document DB 111 and the layout setting DB 112. Then, the display controller 101 causes the user terminal 20 to display a user interface based on the information acquired from the document management server 10.

Next, the operation of the document management server 10 will be described.

Figure 13:
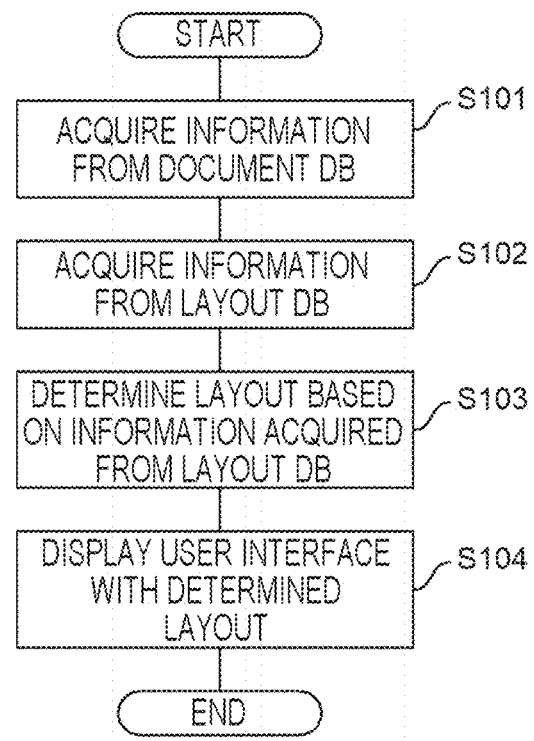
FIG. 13 is a flowchart illustrating a flow of a user interface providing process by the document management server.

FIG. 13 is a flowchart illustrating a flow of a user interface providing process by the document management server 10. The CPU 11 reads a user interface providing program from the ROM 12 or the storage 14 and expands and executes the program on the RAM 13, whereby the user interface providing process is performed.

The flowchart illustrated in FIG. 13 is an operation example of the document management server 10 when an operation related to display of the user interface is performed from the user terminal 20 and a display request for the user interface is transmitted to the document management server 10.

First, the CPU 11 accesses the document DB 111 and acquires information necessary for displaying a user interface on the user terminal 20 (step S101).

Subsequently, the CPU 11 accesses the layout setting DB 112 and acquires information necessary for displaying a user interface on the user terminal 20 (step S102). The order of the process in step S101 and the process in step S102 may be reversed.

The CPU 11 determines the layout of the user interface to be displayed on the user terminal 20 based on the information acquired from the layout setting DB 112 (step S103). For example, a case may be considered where the user interface is to be displayed on the user terminal 20 with the layout setting having the layout setting ID "layout001" among the layout settings illustrated in FIG. 7. In this case, the CPU 11 determines the layout of the user interface to be the layout of pattern 6 illustrated in FIG. 8. Then, the CPU 11 determines the initial values of the height and the width of each pane and the initial values of the open/close states of each pane based on the information acquired from the layout setting DB 112.

Subsequent to step S103, the CPU 11 causes the user terminal 20 to display the user interface with the determined layout (step S104).

A specific example of a user interface displayed on the user terminal 20 by the CPU 11 will be described. Here, descriptions will be made on a case where the CPU 11 displays a user interface on the user terminal 20 with the layout of pattern 6 illustrated in FIG. 8. The user interface described below may be displayed on a general-purpose application, such as a Web browser, or may be displayed on a dedicated application specialized for the document management system according to the present exemplary embodiment.

Figure 14:
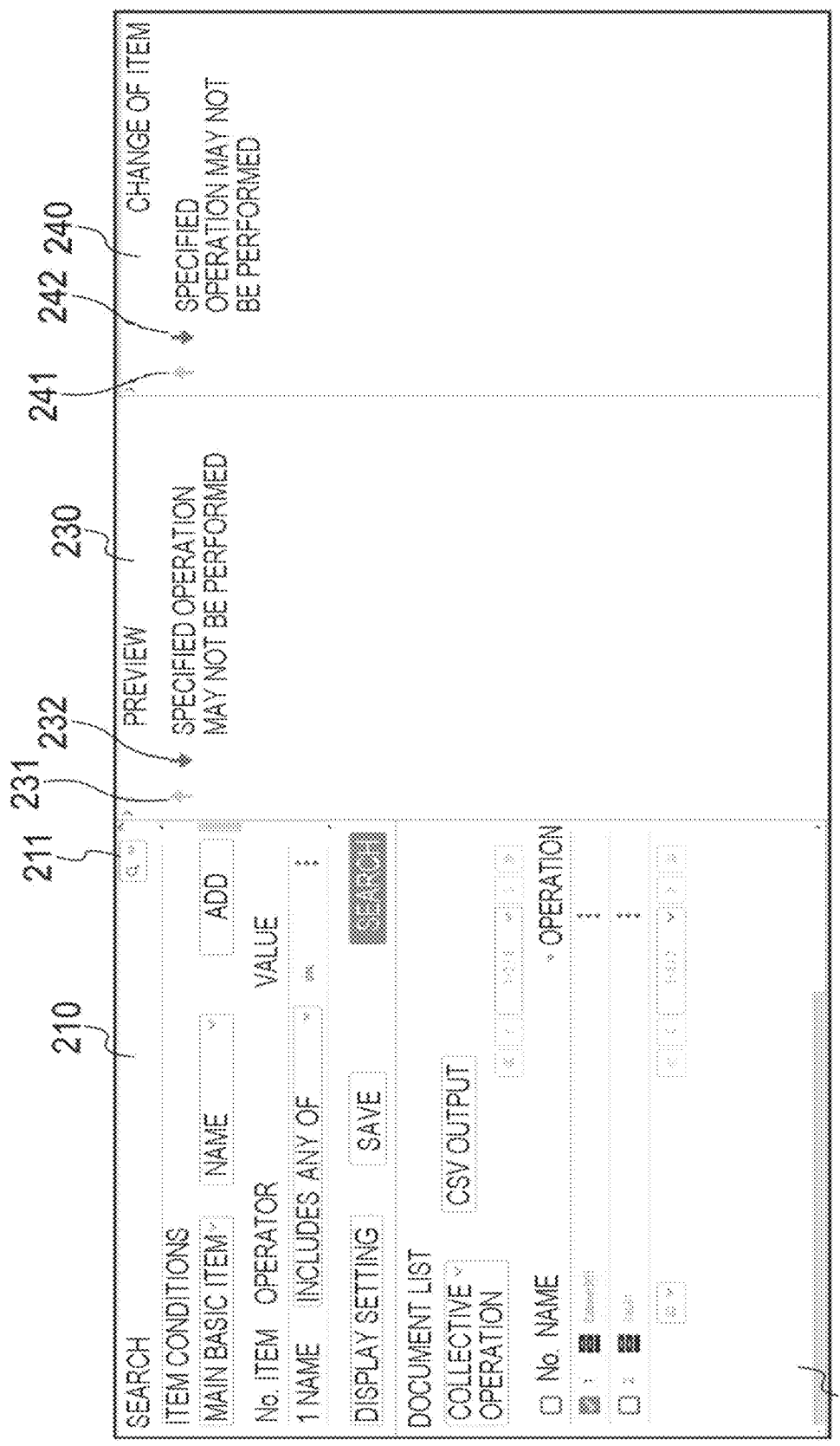
FIG. 14 is a diagram illustrating an example of a user interface.

FIG. 14 is a diagram illustrating an example of a user interface that the CPU 11 causes the user terminal 20 to display. The user interface illustrated in FIG. 14 includes a navigation pane 210, a document list pane 220, a property 1 pane 230, and a property 2 pane 240. The navigation pane 210 and the document list pane 220 are arranged vertically, the property 1 pane 230 is arranged on the right of the navigation pane 210 and the document list pane 220, and the property 2 pane 240 is arranged on the right of the property 1 pane 230. The property 1 pane 230 is a pane for displaying a preview image, and the property 2 pane 240 is a pane for allowing a user to edit item values associated with document data.

In the navigation pane 210, a switching button 211 for receiving switching of the user interface displayed in the navigation pane 210 is displayed. When the user performs an operation on the switching button 211, the CPU 11 may change the user interface displayed on the navigation pane 210. As described above, in the navigation pane 210, for example, a screen for displaying the storage location of document data in a tree structure, a screen for searching for document data, a screen for displaying the search setting of document data, and a screen for directly accessing the user's favorite document data are displayed.

The property 1 pane 230 displays a button 231 for receiving movement to the previous document data and a button 232 for receiving movement to the next document data. Similarly, the property 2 pane 240 displays a button 241 for receiving movement to the previous document data and a button 242 for receiving movement to the next document data. The buttons 231, 232, 241, and 242 that receive movement to the document data are collectively referred to as "document forward buttons".

In the user interface illustrated in FIG. 14, a list of folders storing document data matching the search result input by the user in the navigation pane 210 is displayed in the document list pane 220.

The user interface illustrated in FIG. 14 is in a state where no document data is selected in the document list pane 220 by the user. Therefore, in FIG. 14, the preview image is not displayed in the property 1 pane 230, and a screen for allowing the user to edit the item value is not displayed in the property 2 pane 240.

Figure 15:
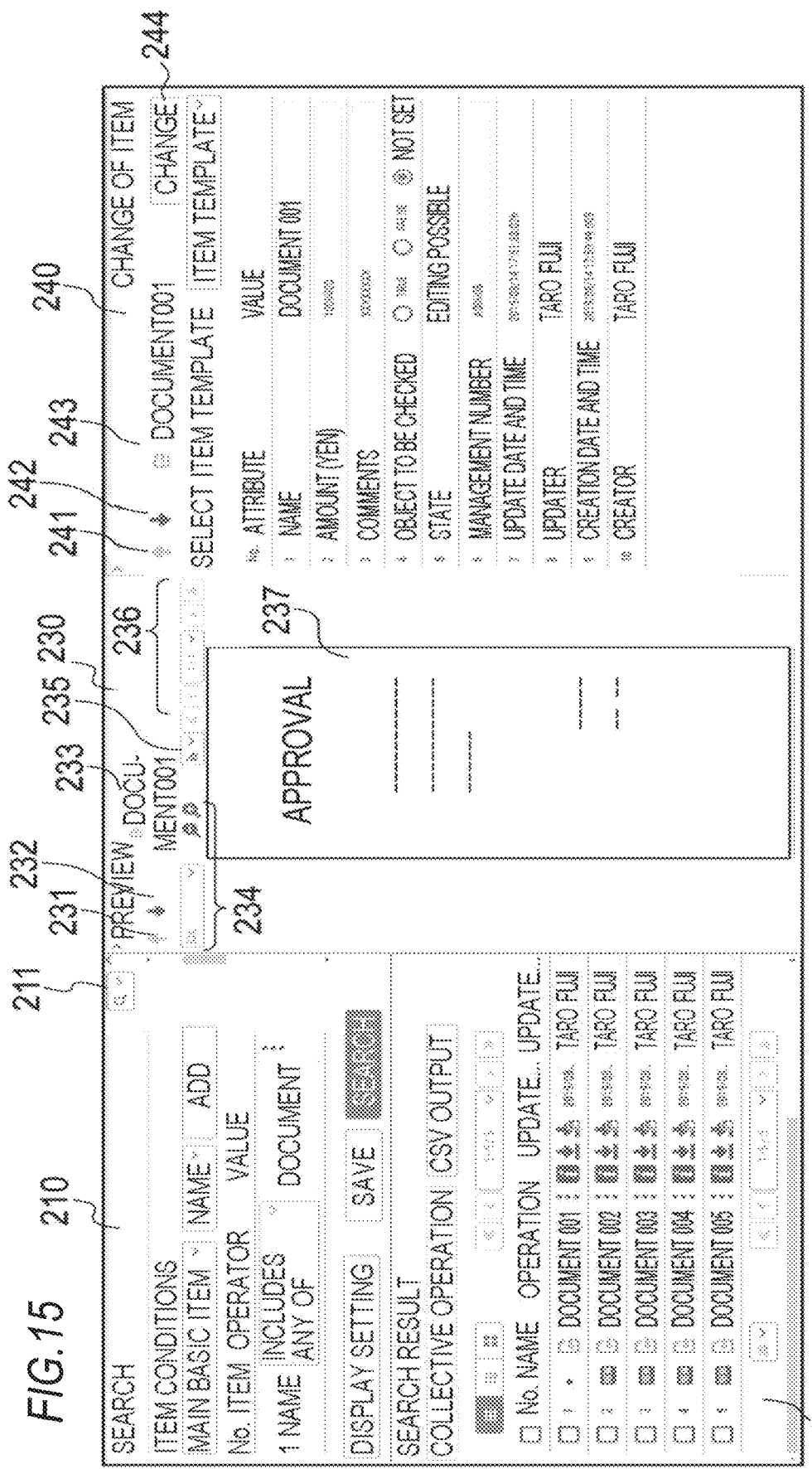
FIG. 15 is a diagram illustrating an example of a user interface.

FIG. 15 is a diagram illustrating an example of a user interface displayed on the user terminal 20 by the CPU 11. The user interface illustrated in FIG. 15 is an example of a user interface displayed on the user terminal 20 in a state where document data is selected by the user in the document list pane 220 in the user interface illustrated in FIG. 14. When the document data is selected by the user in the document list pane 220, the CPU 11 displays a preview image 237 of the selected document data on the property 1 pane 230. When the document data is selected by the user in the document list pane 220, the CPU 11 causes the property 2 pane 240 to display a screen for allowing the user to edit the item values associated with the selected document data. The item values displayed in the property 2 pane 240 are values stored in the document DB 111. The CPU 11 acquires the information on the row of the document ID of the selected document data from the document DB 111 and displays the information on the property 2 pane 240.

The property 1 pane 230 includes document forward buttons 231 and 232, a name display section 233 that displays the name of document data, an enlargement ratio change section 234 that receives a change in the enlargement ratio of the preview image, an editing restriction section 235 that causes selection of whether to restrict editing of document data, a page change section 236 that receives a change in the page to be previewed, and a preview image 237 of the document data selected in the document list pane 220. The property 2 pane 240 illustrates document forward buttons 241 and 242, a name display section 243 that displays the name of document data, and a change button 244 that reflects the editing result. When the user performs an operation on the change button 244, the CPU 11 updates the information in the document DB 111 to the content input by the user.

By displaying the user interface illustrated in FIGS. 14 and 15 on the user terminal 20, the CPU 11 may improve the convenience of the user as compared with a case where another layout pattern is displayed on the user terminal 20.

In the user interface illustrated in FIGS. 14 and 15, the property 1 pane 230 is arranged on the right side of the navigation pane 210 and the document list pane 220, and the property 2 pane 240 is arranged on the further right side of the property 1 pane 230. However, the present disclosure is not limited to such an example. For example, the CPU 11 may arrange a property pane that displays a preview image on the right side of a property pane for allowing a user to edit an item value. Further, for example, the CPU 11 may arrange two property panes on the left side of the navigation pane and the document list pane.

In a case where the screen of the user terminal 20 is small or the number of pixels in the horizontal direction is not large, when four panes are always displayed on the screen, the size of one pane in the horizontal direction is reduced, and the user's convenience is rather reduced. Therefore, when document data is not selected in the document list pane 220, such as when searching for document data, the CPU 11 may cause the property 2 pane 240 to be in a folded state. That is, the CPU 11 may not display the property 2 pane 240 when document data is not selected in the document list pane 220, such as when searching for document data. Then, after the document data is selected in the document list pane 220, the CPU 11 may fold the navigation pane 210 and the document list pane 220 and expand and display the property 2 pane 240. The CPU 11 may determine whether to fold the pane with reference to the open/close state list 132 of the layout setting DB 112. The CPU 11 may acquire the size of the screen of the user terminal 20 and determine whether to fold the pane based on whether the number of pixels of the acquired size in the horizontal direction is equal to or greater than a threshold.

Figure 16:
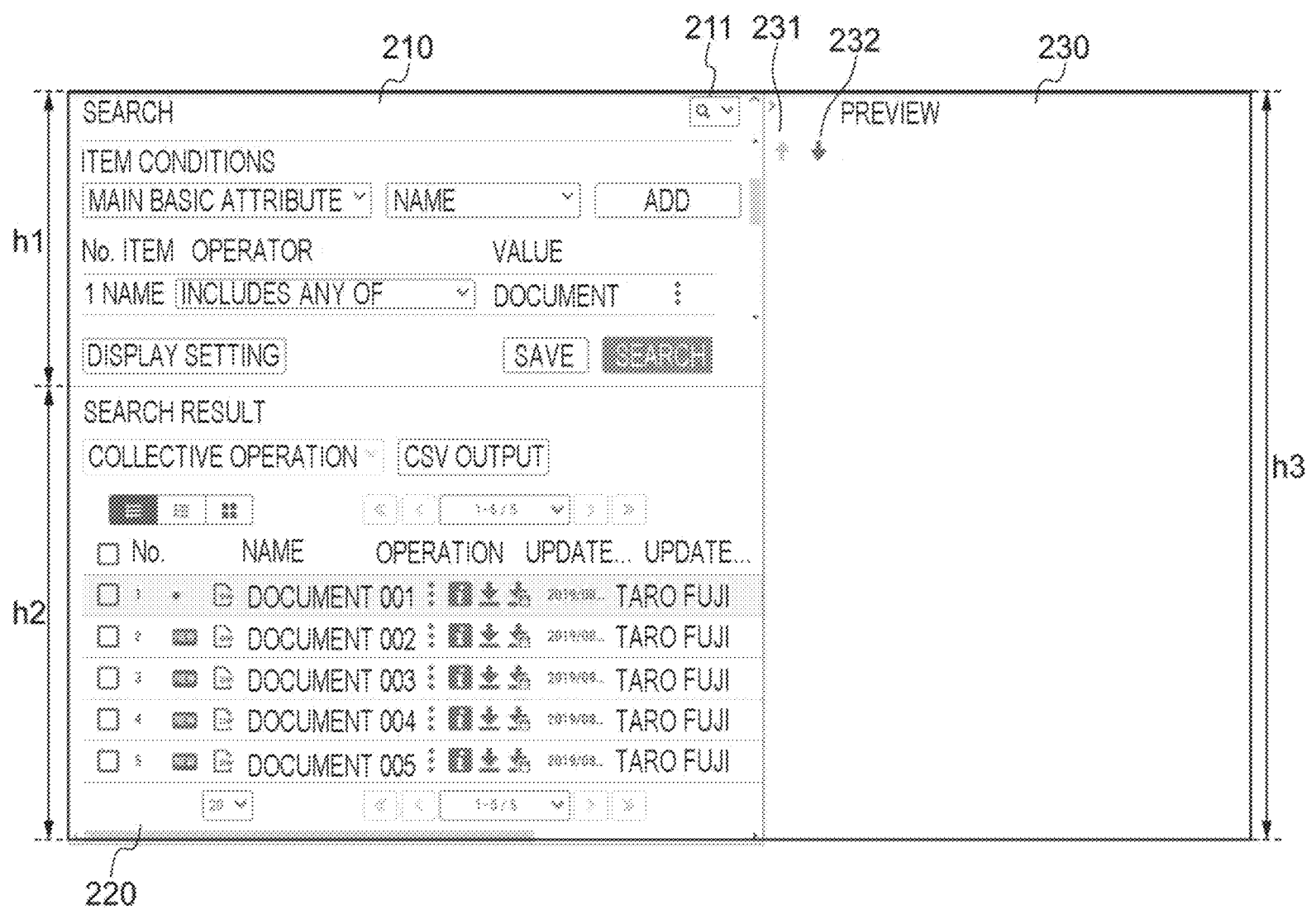

FIG. 16 is a diagram illustrating an example of a user interface displayed on the user terminal 20 by the CPU 11. The user interface illustrated in FIG. 16 is an example of a user interface in a state where the property 2 pane 240 is folded, that is, this component is not displayed in the user interface illustrated in FIG. 14.

Figure 17:
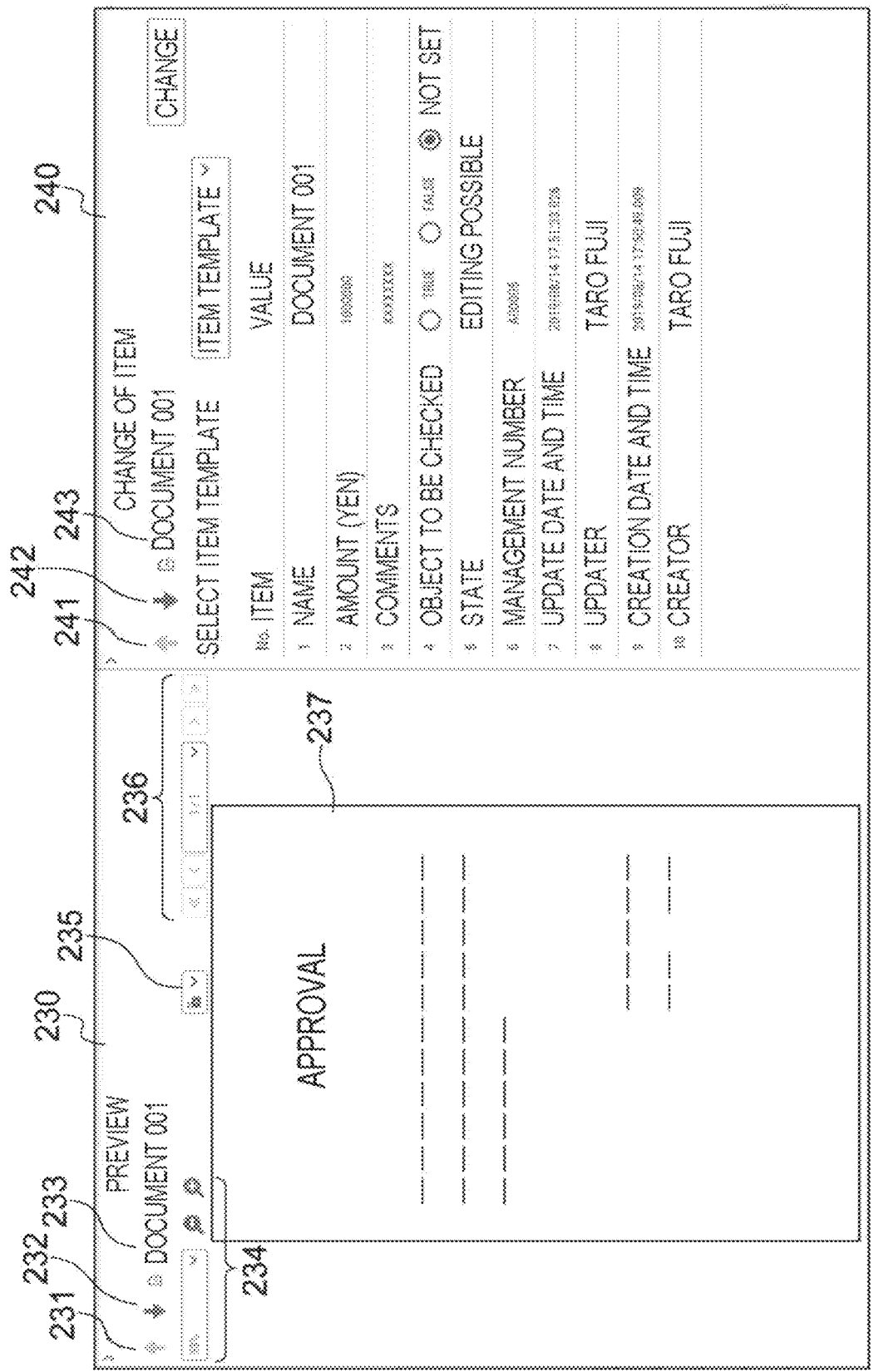
FIG. 17 is a diagram illustrating an example of a user interface.

FIG. 17 is a diagram illustrating an example of a user interface displayed on the user terminal 20 by the CPU 11. The user interface illustrated in FIG. 17 is an example of a user interface in a state where the navigation pane 210 and the document list pane 220 are folded, that is, these components are not displayed, in the user interface illustrated in FIG. 15.

The CPU 11 may effectively utilize the screen of the user terminal 20 by changing the display of the pane according to whether the document data is selected by the user.

Here, the height of each pane will be described with reference to FIG. 16. For example, a symbol h1 illustrated in FIG. 16 may be the height of the navigation pane 210. Further, for example, a symbol h2 may be the height of the document list pane 220. Also, a symbol h3 may be the height of the property 1 pane 230.

The CPU 11 may provide a document forward function to a user interface displayed on the user terminal 20. The CPU 11 provides, for example, a document forward button having up and down arrows on the property pane. When the user performs an operation on the document forward button, the CPU 11 may shift a focus of the list displayed in the document list pane and change the preview image and the item value displayed in the property pane. Therefore, by providing the document forward function to the user interface, the CPU 11 may allow the user to efficiently browse the preview image and edit the item values.

The CPU 11 may reflect the operation performed by the user in each of the panes on the display of another pane. In other words, the CPU 11 may control the contents that are displayed by the functions provided in each of the panes of the user interface displayed on the user terminal 20 according to the operation of the user, and reflect the result of the control on the display of each pane.

For example, it is assumed that the CPU 11 causes the user to perform an operation related to document data search on the navigation pane 210 and perform an operation related to folder selection on the search result displayed on the document list pane 220. In this case, the CPU 11 may control the hidden tree display to follow an operation related to the folder selection performed by the user on the document list pane 220.

A specific example will be described. The user performs an operation on the switching button 211 to switch the navigation pane 210 from a tree display screen to a screen for searching for document data and executes a search for document data. As a result, a list of folders storing document data matching the search result is displayed in the document list pane 220. Subsequently, the user selects one of the folders displayed in the document list pane 220 and opens the folder. Thereafter, when the user operates the switching button 211 to switch the navigation pane 210 from a screen for searching for document data to a screen for displaying a tree, the CPU 11 controls display so that a tree is displayed in the navigation pane 210 in a state where the folder is expanded to the folder selected by the user in the document list pane 220.

Further, for example, when the user edits an item value in the property 2 pane 240, the CPU 11 may store the focus position of the document list pane 220. Then, after executing reloading of the document list pane 220, the CPU 11 may set the focus position of the document list pane 220 to the stored position.

A specific example will be described. For example, in a state where the user interface is displayed as illustrated in FIG. 15, the user focuses on the document data displayed second from the top of the third page in the document list pane 220. Then, a preview image of the document data is displayed in the property 1 pane 230, and items and item values of the document data are displayed in the property 2 pane 240. In this state, the user edits the file name in the property 2 pane 240 and presses the change button 244. When the file name is edited, it is desirable that at least the document list pane 220 be reloaded in order to update information such as the file name, update date and time, and the updater displayed in the document list pane 220. However, when the document list pane 220 is simply reloaded, the focus returns to the top of the first page of the list displayed in the document list pane 220. When the focus returns to the top of the first page of the list every time the document is reloaded, the user may not continuously browse and edit the document data that has been edited.

Therefore, when the user edits the item value, the CPU 11 stores the focus position as the second from the top of the third page. After reloading the document list pane 220, the CPU 11 returns the focus position to the second position from the top of the third page. By storing the focus position of the document list pane 220 when the user edits the item value, the CPU 11 may improve the work efficiency of the user as compared with a case where the focus position is not stored.

In addition to reloading the entire document list pane, the CPU 11 may determine the information whose display is to be updated and reload the document list pane when the information whose display is to be updated has been updated by the user. In other words, when information other than the information displayed in the document list pane is updated by the user, the CPU 11 does not need to reload the document list pane.

The CPU 11 reflects the operation by the user performed in each of the panes on the display of the other panes, so that the work efficiency of the user may be improved as compared with a case where the operation performed by the user performed in each of the panes is not reflected on the display of the other panes.

Next, an example of a use case of the document management system according to the present exemplary embodiment will be described.

In the following, an example will be described in which the user executes a task of checking the preview image of the document data stored in the document management system and changing the item values of the document data as necessary.

Figure 18:
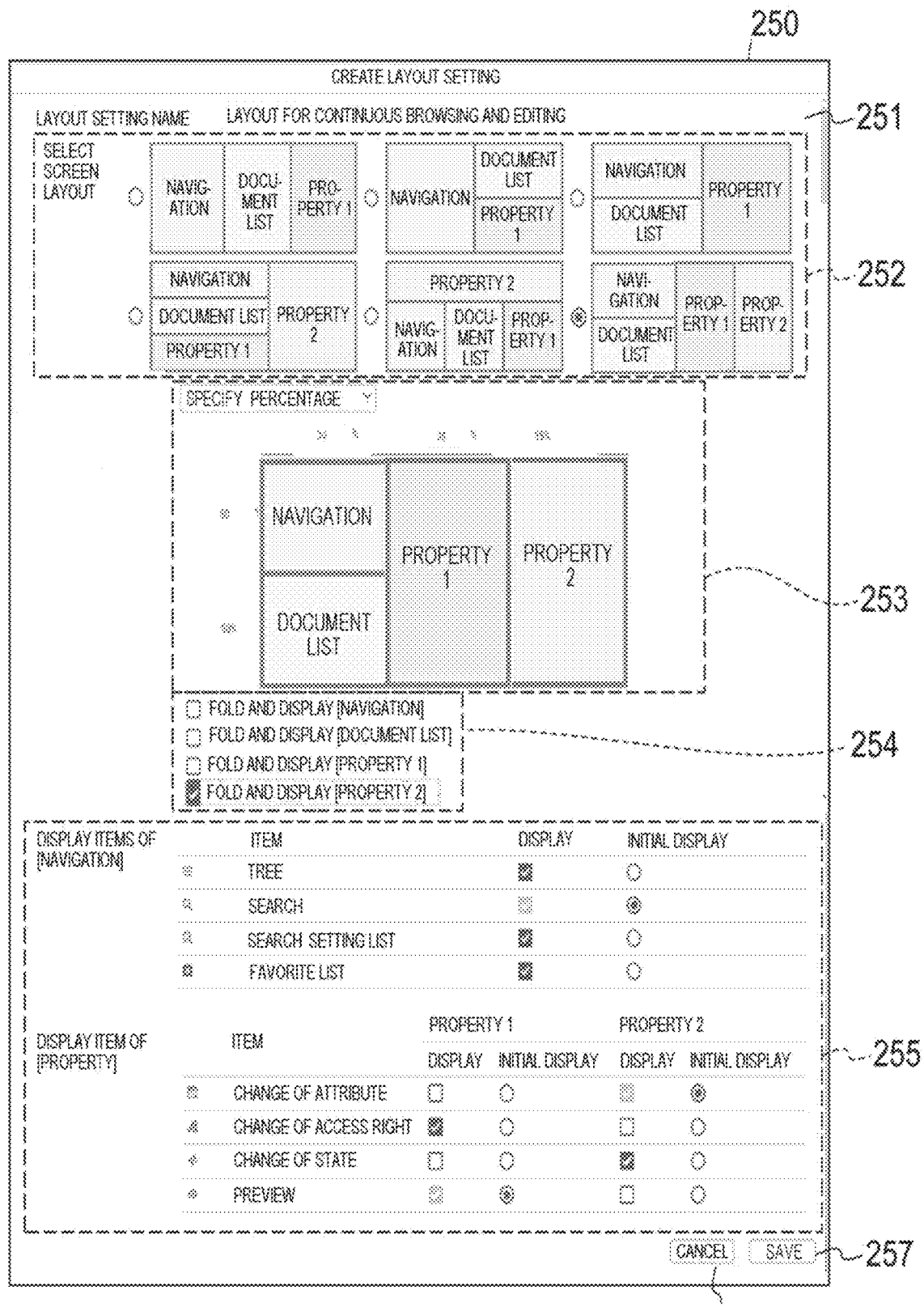
FIG. 18 is a diagram illustrating an example of a user interface.

The user uses the user terminal 20 to create a layout setting that suits his or her taste. Here, the user creates a layout setting specialized for a task of continuously browsing document data and editing attributes. FIG. 18 is a diagram illustrating an example of a user interface provided by the CPU 11. FIG. 18 illustrates a layout setting creation screen 250 that allows a user to create a layout setting. The layout setting creation screen 250 includes a layout setting name input area 251, a layout pattern selection area 252, a size setting area 253, a pane display setting area 254, and a display item setting area 255. The layout setting creation screen 250 includes a cancel button 256 for returning from the layout setting creation screen 250 to the previous screen, and a save button 257 for saving the layout settings in the layout setting DB 112.

When the user performs an operation on the layout setting creation screen 250 and an operation on the save button 257, the CPU 11 generates, for example, the information indicated in the row of the layout setting ID "layout001" in the layout setting DB 112 illustrated in FIG. 7.

The user uses the user terminal 20 to apply the layout setting whose layout setting ID is "layout001", accesses the document management server 10, and searches for desired document data. Based on the layout setting whose layout setting ID is "layout001", the CPU 11 displays a user interface for causing the navigation pane 210 to search for document data, for example, as illustrated in FIG. 14.

The user inputs or specifies a search condition in the navigation pane 210 to execute a search for document data. For example, as illustrated in FIG. 14, the CPU 11 displays, in the document list pane 220, a user interface for displaying a list of folders in which document data matching the search condition is stored.

The user selects one folder from the list displayed in the document list pane 220, and further selects the document data stored in the folder. Then, the CPU 11 displays a preview image of the document data on the property 1 pane 230, for example, as illustrated in FIG. 15. Further, as illustrated in FIG. 15, the CPU 11 displays a user interface for editing the item value associated with the document data in the property 2 pane 240. The user edits the item values displayed in the property 2 pane 240 while browsing the preview image of the document data displayed in the property 1 pane 230.

By performing an operation on the document forward button displayed on the property 1 pane 230 and the property 2 pane 240, the user may continuously check the preview image and edit the item values for plural pieces of document data.

As described above, the document management server 10 according to the present exemplary embodiment provides a user interface as illustrated in FIGS. 14 and 15 to improve the convenience for the user as compared with a case where an area for browsing document data or editing information, and another use for document data, for example, an area for search or selection are arranged vertically.

Various processors other than the CPU may execute a user interface providing process in which the CPU reads and executes the software (program) in each of the above exemplary embodiments. Examples of the processor in this case include a programmable logic device (PLD) whose circuit configuration may be changed after manufacturing a field-programmable gate array (FPGA) or the like and a dedicated electric circuit which is a processor having a circuit configuration specifically designed to execute a specific process such as an application specific integrated circuit (ASIC). The user interface providing process may be executed by one of these various processors, or a combination of two or more processors of the same type or different types (for example, plural FPGAs, and a combination of a CPU and an FPGA). The hardware structure of these various processors is more specifically an electric circuit in which circuit elements such as semiconductor elements are combined.

In each of the above embodiments, descriptions have been made on the mode in which the program for the user interface providing process is stored (installed) in the ROM or the storage in advance, but the present disclosure is not limited to this. The program may be provided on a recording medium such as a compact disk read only memory (CD-ROM), a digital versatile disk-read only memory (DVD-ROM), and a universal serial bus (USB) memory. The program may be downloaded from an external device via a network.

In addition, an operation of the processor in each of the above exemplary embodiments may be performed not by a single processor but also by plural processors existing at physically separated positions in cooperation. The order of each operation of the processor is not limited to the order described in each of the above exemplary embodiments and may be changed as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display control device comprising:
a processor, wherein
the processor displays a plurality of areas,
the plurality of areas comprise:
a first area related to a search for content data by a user,
a second area related to a selection of the content data by the user,
a third area related to a display of content of the content data selected in the second area, and
a fourth area related to the user's edit of information associated with the content data displayed in the third area, wherein
the processor hides the first area and the second area and does not hide the third area and the fourth area when the content data is selected by the user in the second area.

2. The display control device according to claim 1, wherein
the first area is an area is an area for allowing the user to search for content data, and the second area is an area for allowing the user to select any of the content data obtained through the search in the first area.

3. The display control device according to claim 2, wherein the processor hides the fourth area when the user is allowed to search for content data in the first area, and the processor displays the fourth area when the content data is selected by the user.

4. The display control device according to claim 1, wherein the processor arranges the second area below the first area.

5. The display control device according to claim 1, wherein the processor reflects the user's operation performed in each of the areas on a display of another area.

6. The display control device according to claim 5, wherein when an operation related to the edit of the information associated with the content data is performed by the user in the third area or the fourth area, the processor displays the first area or the second area so as to include information on the content data.

7. The display control device according to claim 5, wherein when an operation related to the selection of the content data is performed by the user in the second area and an operation related to a change of a display mode is performed by the user in the first area, the processor reflects on the display of the first area whose display mode has been changed so as to indicate a storage location of the selected content data.

8. The display control device according to claim 1, wherein the processor arranges the plurality of areas horizontally from left to right in order of (i) the first area and the second area, (ii) the third area, and (iii) the fourth area.

9. The display control device according to claim 1, wherein a vertical length of at least one of the third area or the fourth area is longer than those of the first area and the second area.

10. The display control device according to claim 9, wherein the vertical length of the at least one of the third area or the fourth area is equal to or greater than a sum of the vertical lengths of the first area and the second area.

11. The display control device according to claim 1, wherein the processor arranges the third area and the fourth area such that vertical lengths of the third and fourth areas extends over the first area and the second area.

12. A non-transitory computer readable medium storing a program that causes a computer to execute display control processing, the display control processing comprising:

displaying a plurality of areas, the plurality of areas comprise:

a first area related to a search for content data by a user, a second area related to a selection of the content data by the user, a third area related to a display of content of the content data selected in the second area, and a fourth area related to the user's edit of information associated with the content data displayed in the third area, wherein the first area and the second area are hidden and the third area and the fourth area are not hidden when the content data is selected by the user in the second area.

13. A method, comprising:

displaying a plurality of areas, wherein the plurality of areas comprise:

a first area related to a search for content data by a user, a second area related to a selection of the content data by the user, a third area related to a display of content of the content data selected in the second area, and a fourth area related to the user's edit of information associated with the content data displayed in the third area; and hiding the first area and the second area and not hiding the third area and the fourth area when the content data is selected by the user in the second area.

\* \* \* \* \*